United States Patent [19]

Walther

[11] 4,371,213
[45] Feb. 1, 1983

[54] EDGE LUGGED TIRE CARRYING RIM AND WHEEL

[75] Inventor: William D. Walther, Kettering, Ohio

[73] Assignee: Dayton-Walther Corporation, Dayton, Ohio

[21] Appl. No.: 795,063

[22] Filed: May 9, 1977

[51] Int. Cl.³ ............................................. B60B 23/10
[52] U.S. Cl. ................................... 301/12 R; 301/18; 301/13 SM
[58] Field of Search ............ 301/10 R, 11 R, 11 CD, 301/11 S, 12 R, 13 R, 13 SM, 19–20, 22, 35 SS, 35 SL, 96–97; 152/396–398, 406–410

[56] References Cited

U.S. PATENT DOCUMENTS

| 2,027,408 | 1/1936 | Walther | 301/13 SM X |
| 2,155,988 | 4/1939 | Burger | 301/13 R |
| 2,239,463 | 4/1941 | Mills | 301/20 X |
| 2,241,839 | 5/1941 | Woodward | 301/12 R |
| 2,270,918 | 1/1942 | Ash | 301/13 R |
| 2,633,388 | 3/1953 | Woodward | 301/12 R |
| 4,008,923 | 2/1977 | Walther et al. | 301/12 R |
| 4,049,320 | 9/1977 | DeRegnaucourt et al. | 301/13 SM |

FOREIGN PATENT DOCUMENTS

| 756934 | 10/1933 | France | 301/13 SM |
| 785970 | 5/1935 | France | 301/13 R |
| 755464 | 8/1956 | United Kingdom | 301/11 |

*Primary Examiner*—Charles A. Marmor
*Attorney, Agent, or Firm*—Mack D. Cook, II

[57] ABSTRACT

Dual tire carrying rims seated and locked on a vehicle wheel by fastening assemblies. A wheel has spoke members with dimensioned fellow surfaces for mating engagement with coacting surfaces on a plurality of radially inwardly projecting clamp lugs. A rim base edge portion is confined and carried by the integrally secured clamp lugs which decrease the effective diameter of a rim.

2 Claims, 5 Drawing Figures

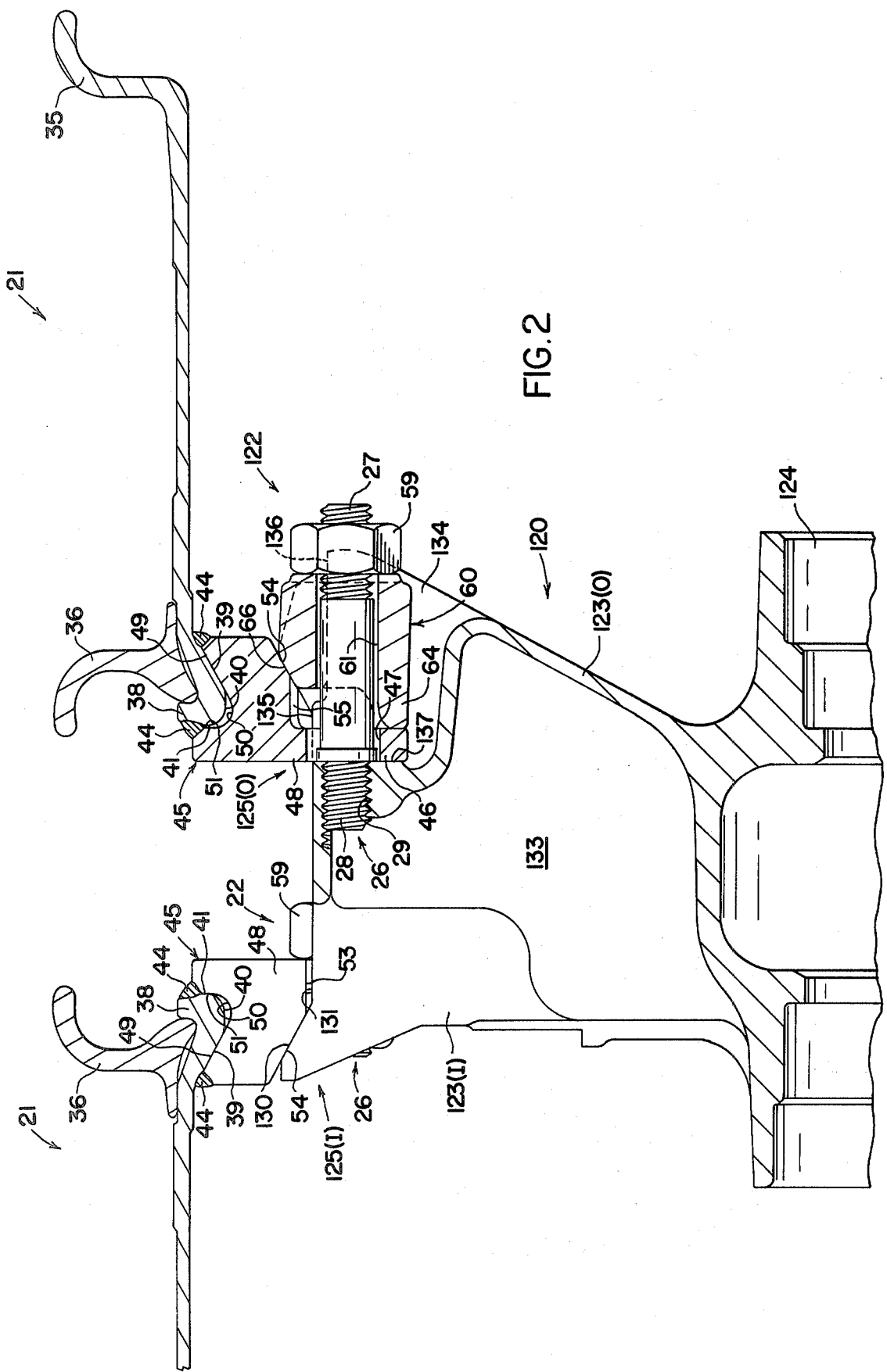

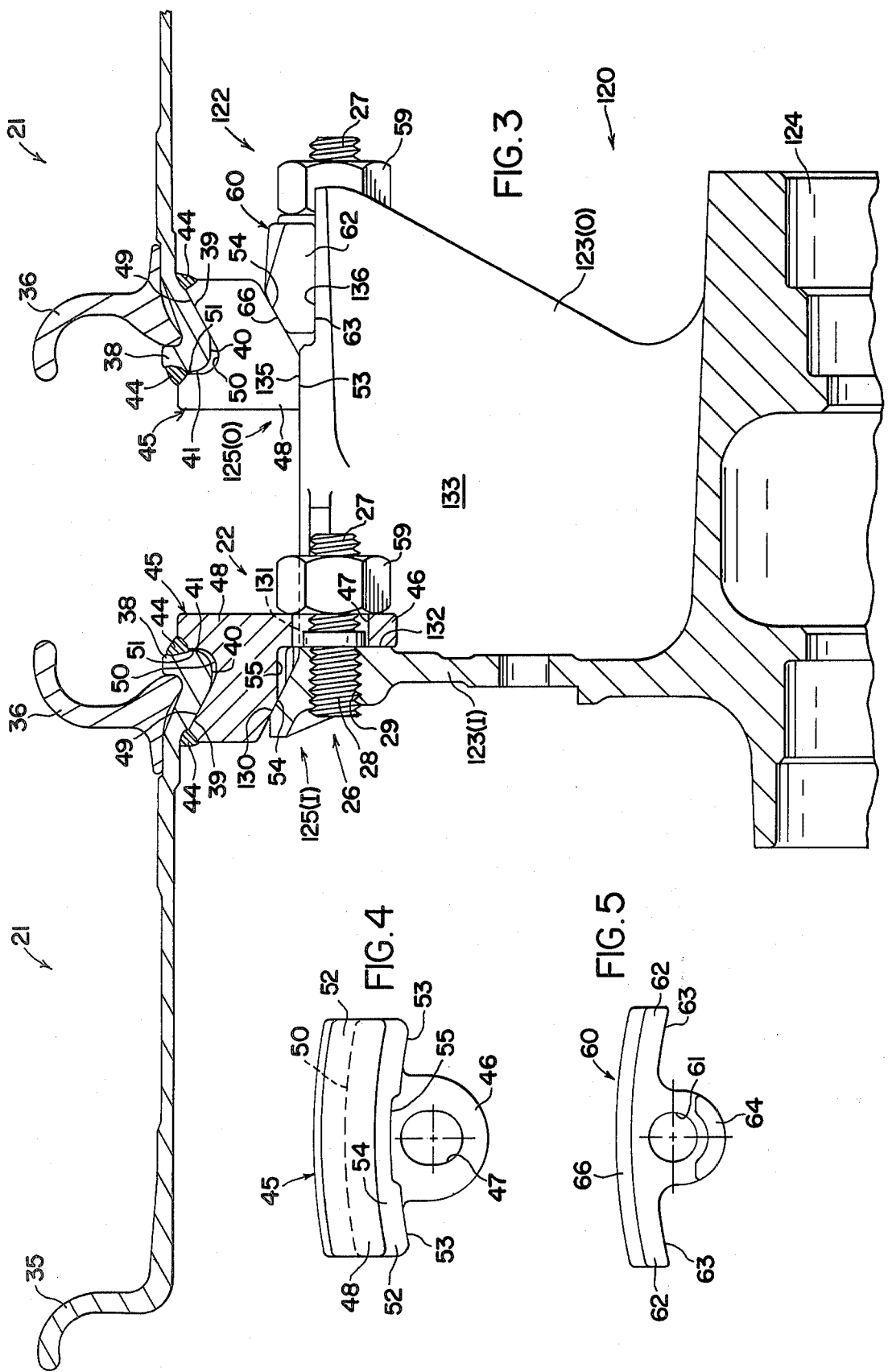

EDGE LUGGED TIRE CARRYING RIM AND WHEEL

BACKGROUND OF THE INVENTION

The present invention relates to a combination of dual inner and outer tire carrying rims mounted on a vehicle wheel without using a separating means, such as an annular spacer.

The inner spoke members of a dual wheel have a felly, felloe or load-bearing portion comprising a radially outer portion having a radially inclined surface which may merge into outwardly facing dual axially oriented surfaces, and a radially directed surface oriented transversely between the axially oriented surfaces.

The outer spoke members of a dual wheel have a felly, felloe or load-bearing portion comprising outwardly facing axially inner and axially outer pairs of dual axially oriented surfaces and a radially inwardly directed surface oriented transversely between the axially inner pair of axially oriented surfaces.

A rim according to the invention may be used interchangeably as an inner dual or outer dual, rim. The rim has a base edge portion confined and carried by a plurality of radially inwardly projecting clamp lugs. The clamp lugs decrease the effective diameter of a rim, permitting the mounting of relatively larger diameter rims on relatively smaller diameter wheels.

The improved rim clamp lugs are generally T-shaped, having a radially inwardly directed leg portion and a curved body portion with radially outer surfaces for integral attachment to the rim base edge portion, lateral wing portions for seating on dual axially oriented wheel felloe surfaces and a radially inner face with a radially inclined surface for mating engagement with either a wheel felloe surface or a surface on a clamp element of a fastening assembly.

An initial tightening of the fastening assemblies for an inner dual rim mounting will seat the clamp lug radially inclined surfaces in concentric registry with the radially inclined inner spoke felloe surfaces. Thereafter, the seated rim will be locked on the inner spoke members, in axial and radial alignment and registry, by further tightening of the fastening assemblies against the clamp lug leg portions and the full surface engagement thereof with a radially directed wheel felloe surface.

In the embodiment shown wherein the outer spoke members have a felloe with axially inner and axially outer pairs of dual axially oriented surfaces, an initial tightening of fastening assemblies using a generally T-shaped clamp element will seat the clamp lug lateral wing portions in radial registry with the axially inner pair of dual axially oriented surfaces and the clamp lug radially inclined surfaces in concentric registry with a conforming radially outer clamp element surface. Thereafter, the seated rim will be locked on the outer spoke members, in axial and radial alignment and registry, by further tightening of the fastening assemblies against the clamp lug leg portions and the full surface engagement thereof with a radially directed wheel felloe surface.

According to the invention, the clamp lugs are proportioned or dimensioned such that during final tightening, a fastening assembly will elastically stress or minutely deform each clamp lug and the rim base edge portion relative to the plane of the radially directed wheel felloe surfaces to provide the full axial and radial alignment and registry of rim to wheel.

The prior art relating to tire carrying rims demountably carried on vehicle wheels includes patents to be found in Class 301 beginning with Subclass 10R. Other relevant patents may be found in Class 152, Subclasses 406X et seq.

Other prior art known to the applicants includes an adapter ring which makes possible the use of larger diameter (22") dual tires and rims on a smaller diameter (20") wheel with a conventional (28°) mounting bevel. The adapter ring requires a separating means, such as an annular spacer or band. With the adapter ring in place, the rim and tire can be mounted or removed in the ordinary manner. The referenced adapter ring is more fully disclosed in the prior art publication, "Firestone Steel Products Company, Akron, Ohio, Catalog No. F-49, p. 29", (publication date unknown).

The accurate mounting of tire carrying rims on the felloe, felly or load-bearing portion of a wheel has long been a problem in the art. Vehicle operators and industry regulations seek longer tire life and complete safety in operation, even under the most severe of vehicle operating conditions. The tire manufacturers are endeavoring to provide tires which have optimum performance characteristics, including lateral and radial balance. Consequently, it is being required that this art provide elements, the wheels, the rims, and fastening assemblies therefor, which do not deteriorate, hinder or impair the projected performance characteristics of the tires.

Heretofore, the spoked wheel structure of a tire-rim-wheel assembly has been regarded primarily as a load carrying element attached to an axle of the vehicle and carrying the rim. The periphery of the wheel had felly surfaces to pilot or guide the rim into approximate mounting position. Thereafter, fastening assemblies were torqued down or tightened in such a manner that the tire carrying rim would not come loose from the wheel during use. If done correctly, as by an expert and conscientious mechanic, the prior art rim mounting techniques would not deteriorate, hinder or impair the performance characteristics of the tires. However, environmental or extrinsic factors such as warpage, deformation or damage to the rim and spacer or wear of the fastening assemblies could lead to relative displacement or non-alignment of the assembly components during fastening, creating conditions of what are now commonly referred to as excessive lateral (axial) or radial runout or an imbalance of the tire-rim-wheel assembly during vehicle operation.

The concepts of the invention provide wheel spoke members with proportioned or dimensioned felloe surfaces for mating, seating or full surface engagement with coacting surfaces on the radially inwardly projecting clamp lug leg portions by full tightening of the fastening assemblies. The clamp lugs will also provide a combination of a relatively larger diameter tire carrying rim seated and locked by fastening assemblies on a smaller diameter wheel.

An edge lugged rim and fastening assemblies therefor according to the invention, when used with wheels adapted thereto, reduces weight and cost, positively controls and reduces lateral (axial) and radial runout, resists rim warpage or deformation, restricts or locks out the possibility of rim rotation relative to the wheel and provides better balance for the tire-rim-wheel assembly during vehicle operation.

SUMMARY OF THE INVENTION

The object of the invention is to provide an improved combination of a tire carrying rim seated and locked by fastening assemblies on a vehicle wheel.

It is a further object of the invention to provide rims having a rim base edge portion carried by a plurality of clamp lugs integrally secured thereto; each clamp lug having a radially inclined surface, dual axially oriented surfaces and a radially inwardly directed leg portion which are mounted on the spoke members of a wheel having coacting felloe surfaces by the full tightening of fastening assemblies.

It is a further object of the invention to provide a combination of a relatively larger diameter tire carrying rim seated and locked by fastening assemblies on a relatively smaller diameter wheel, tending to reduce the weight and cost of the rim-wheel combination, and which positively controls and reduces lateral (axial) and radial runout, resists rim warpage or deformation, restricts rim rotation relative to the wheel and provides better balance for the tire-rim-wheel assembly during vehicle operation.

These and other objects of the invention, as well as the advantages thereof, will be apparent in view of the detailed description of the various embodiments thereof as hereinafter set forth.

In general, a dual wheel according to the invention has a plurality of inner and outer spoke members. Each inner spoke member has a felloe comprising a radially inclined surface and an adjacent radially directed surface oriented in a plane substantially perpendicular to the rotational axis of the wheel and providing a mounting location for an axially projecting component of a fastening assembly. Each outer spoke member has a felloe comprising spaced-apart axially projecting wing portions providing for outwardly facing axially inner and axially outer pairs of dual axially oriented surfaces and a radially directed surface extending inwardly between the axially inner pair of axially oriented surfaces substantially perpendicular to the rotational axis of the wheel and providing a mounting location for an axially projecting component of a fastening assembly.

In general, a tire carrying rim according to the invention has a rim base edge portion comprising a radially inclined axially inner surface and an adjacent axially outer surface. The rim base edge portion has a plurality of radially inwardly projecting generally T-shaped clamp lugs integrally secured thereto.

Each rim clamp lug has a body portion with a radially outer face comprising a radially inclined axially inner surface and an adjacent axially outer surface. The radially inclined and axially outer clamp lug face surfaces are in mating engagement with the radially inclined and axially outer rim base edge portion surfaces when each clamp lug is integrally secured to the rim base edge portion.

Each clamp lug further has a radially inwardly directed leg portion extending inwardly from a body portion substantially perpendicular to the rotational axis of the rim and with a bore therein for receiving an axially projecting component of the fastening assemblies.

Each clamp lug body portion further has lateral wing portions which may be positioned for mating engagement with outwardly facing dual axially oriented felloe surfaces.

Each clamp lug body portion still further has a radially inner face adjacent a leg portion and comprising a radially inclined axially inner surface intersecting an axially directed transitional surface terminating at a leg portion.

The clamp lugs are proportioned or dimensioned such that during final tightening of a fastening assembly, each clamp lug and the rim base edge portion will be placed under load, and thereby elastically stressed or minutely deformed relative to the plane of a radially directed wheel felloe surface in full surface engagement with the leg portion of each clamp lug.

In general, each fastening assembly for mounting an inner dual rim will comprise a threaded fastener having a rotatable element for bearing engagement against the leg portion of each clamp lug.

In general, each fastening assembly for mounting an outer dual rim will have an axially projecting component and an axially movable clamp element and a rotatable element supported thereon. The rotatable element is for bearing engagement against the axially outer surface of the clamp element. Each clamp element will have lateral wing portions for mating engagement with an axially outer pair of axially oriented fello surfaces and an axially inwardly directed member for mating engagement with the leg portion of a clamp lug. The clamp element will also have a radially outer portion for mating engagement with a radially inclined surface on each clamp lug body portion.

According to the invention, an inner dual tire carrying rim is seated on, and thereafter locked on, a wheel by the initial and final tightening of fastening assemblies against each clamp lug leg portion. During initial tightening of the fastening assemblies, the radially inclined clamp lug body surfaces will seat in concentric registry with the radially inclined wheel felloe surfaces. Optionally, the lateral wing clamp lug body portions may be seated in radially registered engagement with the outwardly facing dual axially oriented wheel felloe surfaces. Final tightening of the fastening assemblies to apply a compression load will lock the inner dual rim on the wheel, in axial and radial alignment and registry relative to the rotational axis of rim and wheel, by the full surface engagement of the clamp lug leg portions with the radially directed wheel felloe surfaces and the elastic deformation of the clamp lugs and the rim base edge portion relative to the substantially perpendicular plane of the radially directed wheel felloe surfaces.

According to the invention, an outer dual tire carrying rim is seated on, and thereafter locked on, a wheel by initial and final tightening of fastening assemblies. During initial tightening of the fastening assemblies, with the axially movable clamp elements in mating engagement with the clamp lug leg portions, the radially inclined clamp lug body surfaces will seat in concentric registry with the radially inclined clamp element surfaces. Final tightening of the fastening assemblies to apply a tension load will lock the outer dual rim on the wheel, in axial and radial alignment and registry relative to the rotational axis of rim and wheel, by the full surface engagement of the clamp lug leg portions with the radially directed wheel felloe surfaces and the elastic deformation of the clamp lugs and the rim base edge portion relative to the substantially perpendicular plane of the radially directed wheel felloe surfaces.

IN THE DRAWINGS

FIG. 2 is a sectional view through an outer spoke member, taken substantially as indicated on line 2—2 of FIG. 1;

FIG. 3 is a sectional view through an inner spoke member, taken substantially as indicated on line 3—3 of FIG. 1;

FIG. 4 is a plan view of a rim clamp lug according to the invention; and,

FIG. 5 is a plan view of a fastening assembly clamp element as used in FIGS. 1, 2 and 3.

DETAILED DESCRIPTION OF THE INVENTION

Figure 1:
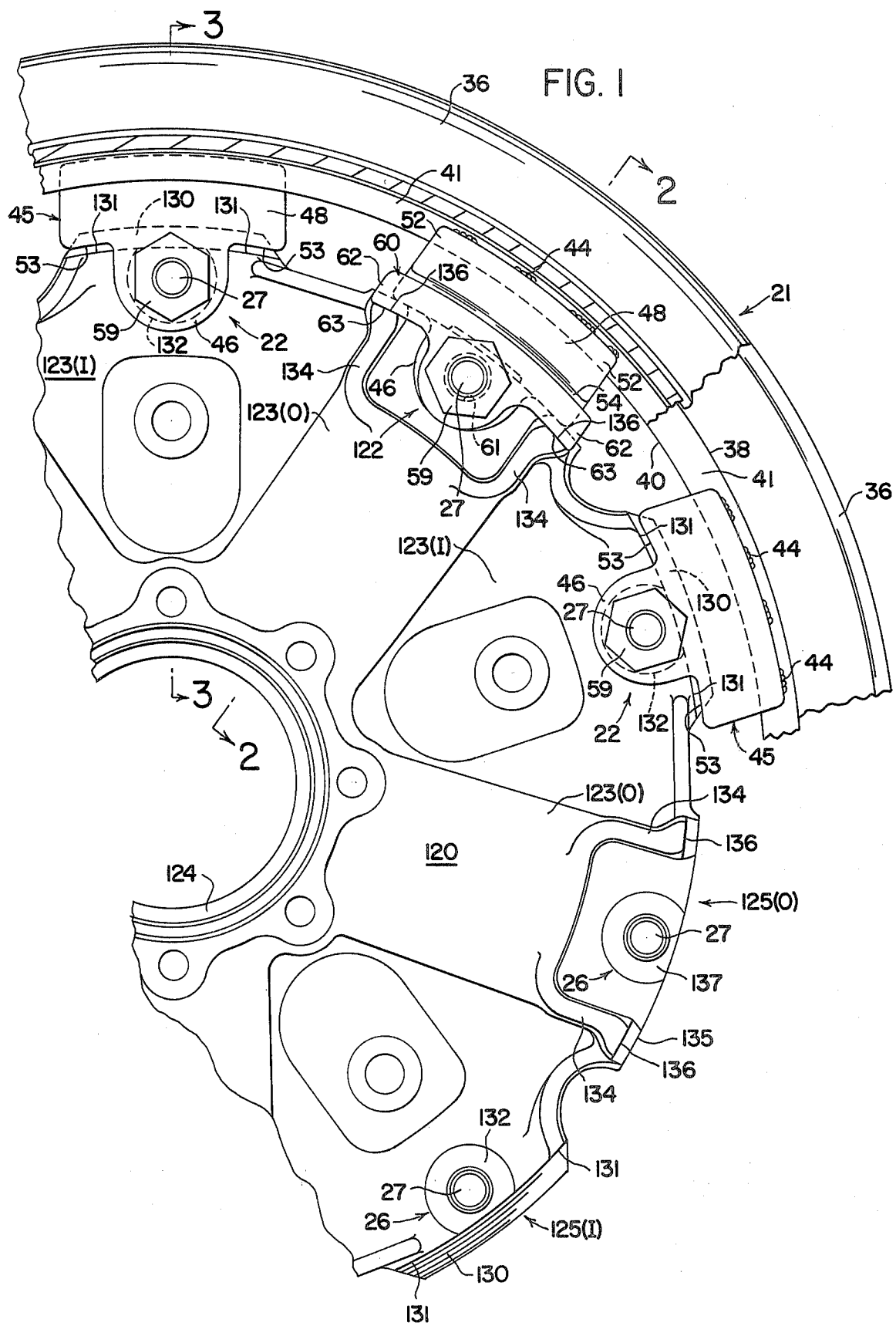
FIG. 1 is a fragmentary view of the embodiment of a dual wheel and tire carrying rims and a fastening assembly according to the invention.

A tire carrying rim according to the invention is referred to generally by the numeral 21.

Fastening assemblies for seating and locking of a rim 21 used as an inner dual rim are referred to generally by the numeral 22. The fastening assemblies for a rim 21 used as an outer dual rim are referred to generally by the numeral 122.

A dual wheel 120 has a plurality of alternating inner and outer spoke members, 123(I) and 123(O), with an axially spaced-apart and staggered relation to an adjacent spoke member. Each spoke member extends radially from a conventional hub area 124 and terminates in a felloe portion. The inner felloes are referred to generally by the numeral 125(I); the outer felloes are referred to generally by the numeral 125(O).

Each wheel felloe 25, 125(I) or 125(O), has a predetermined mounting location indicated generally at 26 for the axially projecting component of a fastening assembly 22 or 122. As shown, the axially projecting component of a fastening assembly 22 or 122 is a stud 27 having an inner end with peripheral threads 28 for mating engagement with bore threads 29. Alternatively, the studs 27 may be attached at the mounting locations 26, as by conventional arc stud or capacitor discharge welds.

As best shown in FIG. 3, each inner felloe 125(I) on a dual wheel 120 has a radially outer portion with a radially inclined surface 130 merging into outwardly facing dual axially oriented surfaces 131. The radial dimension of the dual surfaces 131 will be determined primarily by the manufacturing techniques used to produce a wheel 120 for use in mounting the dual, inner and outer, rims 21. Each felloe 125(I) also has a radially directed surface 132 adjacent a radially inclined surface 130 or oriented between the axially oriented surfaces 131. Each surface 132 has a mounting location 26 for the axially projecting component of a fastening assembly 22 and is substantially perpendicular to the rotational axis of a wheel 120. Each felloe 125(I) is preferably interconnected with an adjacent outer felloe 125(O) by web portions 133 extending axially of the dual surfaces 131. The web portions 133 may be extended radially toward the hub area 124 of a wheel 120 for purposes of styling or aesthetic design or improving mechanical strength.

As best shown in FIG. 2, each outer felloe 125(O) has spaced-apart axially projecting wing portions 134. The axial wing portions 134 provide for an axially inner pair of axially oriented surfaces 135 and an adjacent axially outer pair of axially oriented surfaces 136. The wing portions 134 may be extended radially toward the hub area 124 of a wheel 120 for purposes of styling or aesthetic design or improving mechanical strength. The outwardly facing axially inner dual surfaces 135 are intended for mating engagement with conforming surfaces on a rim 21, as described hereafter in further detail. The outwardly facing axially outer dual surfaces 136 are intended for mating engagement with conforming surfaces on a clamp element of the fastening assemblies 122, as described hereafter in further detail. As shown, the effective diameter of the dual surfaces 136 may be stepped-down or less than the effective diameter of the dual surfaces 135, permitting the use of a relatively large and therefor stronger fastening assembly clamp element.

Each felloe 125(O) also has a radially inwardly directed surface 137 extending transversely of and between the inner pair of axially oriented surfaces 135. Each surface 137 has a mounting location 26 for the axially projecting component of a fastening assembly 122 and is substantially perpendicular to the rotational axis of a wheel 120.

As shown, a tire carrying rim 21 may have a fixed bead flange 35 and a removable bead flange 36 for seating the beads (not shown) of a tire in a conventional manner. The removable bead flange is carried by an annular rim base edge portion 38.

The rim base edge portion 38 has a radially inclined axially inner surface 39 intersecting an axially oriented radially inner surface 40 intersection a radially directed axially outer surface 41. A rim base edge portion 38 has securely attached or connected thereto, as by welds 44, a plurality of radially inwardly projecting clamp lugs referred to generally by the numeral 45.

Each clamp lug 45 may be regarded as generally T-shaped, having a radially inwardly directed leg portion 46. Each leg portion 46 defines the plane of a substantially continuous axially facing surface oriented substantially perpendicular to the rotational axis of a rim 21 and has a bore 47 therein for receiving the axially projecting component of a fastening assembly 22 or 122. A leg portion 46 extends inwardly from a clamp lug body portion 48 and is intended for mating engagement with a conforming wheel felloe surface 32 or 132.

The radially outer body or cross-bar portion 48 of a clamp lug 45 confines and carries the annular rim base edge portion 38 of a rim 21.

In section, FIGS. 2 and 3, the radially outer face of a clamp lug body portion 48 has a radially inclined axially inner surface 49 intersecting an axially extending generally concave transitional surface 50 intersecting a radially directed axially outer surface 51. The lug surfaces 49 and 51 are intended for mating engagement with the conforming rim base surfaces 39 and 41 when a clamp lug body portion 48 is integrally secured to a rim base edge portion 38, as by welds 44. The resultant void or space between the rim base surface 40 and each clamp lug surface 50 will provide a dimensional tolerance so that during fabrication or manufacture of a rim 21, the clamp lugs 45 may be precisely located and integrally secured relative to the rotational axis of the rim, even when the radially inner dimensions of the annular rim base edge portion surfaces 39, 40 or 41 are not precise or lacking in concentricity.

In plan, FIGS. 1 and 4, a curved clamp lug body portion 48 has dual wing portions 52 extending laterally of a leg portion 46. The lateral wing portions 52 provide for downwardly facing dual axially oriented surfaces 53 intended for seating on conforming dual wheel outer spoke felloe surfaces.

In section, FIGS. 2 and 3, the radially inner face of a clamp lug body portion 48 adjacent a leg portion 46 has a radially inclined axially inner surface 54 intersecting an axially directed transitional surface 55 terminating at a leg portion 46. The radially inclined surface 54 is intended for seating or conforming wheel felloe surfaces, or on a confroming surface on a clamp element of the fastening assemblies, as described hereafter in further detail. The resultant void or space between the transitional surface 55 and either the felloe, or the clamp element of a fastening assembly, will facilitate elastic deformation of the clamp lug leg portions 46 and a rim base edge portion 38 during final tightening of the fastening assemblies 22 or 122.

The fastening assemblies 22 have a rotatable nut 59 carried on the stud 27 for use in mounting a rim 21 on the wheel felloes 125(I). When the rim clamp lugs 45 are seated and locked after tightening of the rotatable nuts 59 against the leg portions 46, the radially inclined surfaces 54 will be in mating engagement with the felloe surfaces 130, the dual axially oriented surfaces 53 may be in mating engagement with the felloe surfaces 131, and the leg portions 46 will be in mating engagement with the radially inwardly directed felloe surfaces 132.

The fastening assemblies 122 have a rotatable nut 59 and an axially movable generally T-shaped clamp element, referred to generally by the numeral 60, carried on the stud 7 for use in mounting a rim 21 on the wheel felloes 125(O). A clamp element 60 has a bore 61 for receiving the stud 27. A clamp element 60 also has lateral wing portions 62 providing for downwardly facing dual axially oriented surfaces 63 for seating on conforming wheel felloe surfaces 136. A clamp element 60 also has an axially inwardly directed member 64 for mating engagement against a clamp lug leg portion 46. The radially outer portion of a clamp element 60 has a radially inclined surface 65 for mating engagement with a conforming rim clamp lug surface 54.

When the rim clamp lugs 54 are seated and locked after tightening of the rotatable nuts 59 against the clamp elements 60, the axially inwardly directed members 64 will be in mating engagement with the leg portions 46, the radially inclined surfaces 54 will be in mating engagement with the clamp element surfaces 65, the dual axially oriented surfaces 53 will be in mating engagement with the axially inner dual felloe surfaces 135, the dual axially oriented clamp element surfaces 63 will be in mating engagement with the axially outer dual felloe surfaces 136, and the leg portions 46 will be in mating engagement with the radially inwardly directed felloe surfaces 137.

In the embodiments of a rim 21, a wheel 120, and and fastening assemblies 22 and 122, as disclosed herein, it is preferred that: all axially projecting or directed components or axially oriented or extending surfaces be substantially parallel to the rotational axis of a rim 21 or a wheel 120; all radially directed portions or surfaces be substantially perpendicular to the rotational axis of a rim 21 or a wheel 120, and all radially inclined surfaces have a suitable angle relative to the rotational axis of a rim 21 or wheel 120 to provide a conical surface for mating engagement and concentric registry with an opposed surface.

What is claimed is:

1. A combination of dual inner and outer tire carrying rims mounted on a vehicle wheel, said outer rim being seated and locked on said rim by fastening assemblies,
   said wheel having a plurality of inner and outer spoke members, each said outer spoke member having a felloe comprising spaced-apart axially projecting wing portions providing for outwardly facing axially inner and axially outer pairs of dual axially oriented surfaces and a radially directed surface extending inwardly between said dual axially oriented surfaces substantially perpendicular to the rotational axis of said wheel and providing a mounting location for an axially projecting component of said fastening assemblies,
   said outer rim having a rim base edge portion comprising a radially inclined axially inner surface and an adjacent axially outer surface, said rim base edge portion having a plurality of radially inwardly projecting clamp lugs intergrally secured thereto,
   each said clamp lug being generally T-shaped and having a radially outer curved body portion with a radially outer face comprising a radially inclined axially inner surface and an adjacent axially outer surface, said radially inclined and axially outer clamp lug face surfaces being in mating engagement with said radially inclined and axially outer rim base edge portion surfaces when each said clamp lug is integrally secured to said rim base edge portion,
   each said clamp lug further having a radially inwardly directed leg portion extending inwardly from said curved body portion and defining the plane of a substantially continuous axially facing surface oriented substantially perpendicular to the rotational axis of said rim and having a bore therein for receiving said axially projecting component of said fastening assemblies,
   each said curved body portion further having lateral wing portions providing downwardly facing dual axially oriented surfaces,
   each said curved body portion still further having a radially inner face adjacent said leg portion and comprising a radially inclined axially inner surface intersecting an axially directed transitional surface terminating at said leg portion,
   each said fastening assembly comprising said axially projecting component and a clamp element supported thereon, each said clamp element having lateral wing portions providing downwardly facing dual axially oriented surfaces, an axially inwardly directed member and a radially outer portion with a radially inclined surface,
   whereby, said outer rim is seated on, and therafter locked on, said wheel by initial and final tightening of said fastening assemblies, said initial tightening of said fastening assemblies with said axially inwardly directed clamp element members in mating engagement with said clamp lug leg portions and said dual axially oriented surfaces on said lateral wing clamp element portions in mating engagement with said axially outer pair of dual wheel felloe surfaces and said dual axially oriented surfaces on said lateral wing clamp lug portons in radially registered engagement with said axially inner pair of dual wheel felloe surfaces, seating said radially inclined clamp lug body portions in concentric registry with said radially inclined clamp element surfaces; said final tightening of said fastening assemblies to apply a load for axial movement of said clamp lug leg portions locking said outer rim on said wheel by the full surface engagement of said substantially continuous axially facing surfaces on said clamp lug leg portions with said radially directed wheel felloe surfaces and the elastic deformation of said clamp lugs and said rim base edge portion relative to said substantially perpendicular plane of said radially directed wheel felloe surfaces.

2. A combination of dual inner and outer tire carrying rims seated and locked by inner and outer rim fastening assemblies on a vehicle wheel, said wheel having a plurality of inner and outer spoke members, each of said inner spoke members having a felloe comprising a radially inclined surface and an adjacent radially directed surface oriented in a plane substantially perpendicular to the rotational axis of said wheel and providing a mounting location for an axially projecting component of said fastening assemblies, each of said outer spoke members having a felloe comprising spaced-apart axially projecting wing portions providing for outwardly facing axially inner and axially outer pairs of dual axially oriented surfaces and a radially directed surface extending inwardly between said dual axially oriented surfaces, substantially perpendicular to the rotational axis of said wheel and providing a mounting location for an axially projecting component of said fastening assemblies, each of said rims having a rim base edge portion comprising a radially inclined axially inner surface and an adjacent axially outer surface, said rim base edge portion having a plurality of radially inwardly projecting clamp lugs integrally secured thereto, each said clamp lug being generally T-shaped and having a radially outer curved body portion with a radially outer face comprising a radially inclined axially inner surface and an adjacent axially outer surface, said radially inclined and axially outer clamp lug face surfaces being in mating engagement with said radially inclined and axially outer rim base edge portion surfaces when each said clamp lug is integrally secured to said rim base edge portion, each said clamp lug further having a radially inwardly directed leg portion extending inwardly from said curved body portion and defining the plane of a substantially continuous axially facing surface oriented substantially perpendicular to the rotational axis of said rim and having a bore therein for receiving said axially projecting component of said fastening assemblies, each said curved body portion further having lateral wing portions providing downwardly facing dual axially oriented surfaces, each said curved body portion still further having a radially inner face adjacent said leg portion and comprising a radially inclined axially inner surface intersecting an axially directed transitional surface terminating at said leg portion, each said outer rim fastening assembly comprising said axially projecting component and a clamp element supported thereon, each said clamp element having lateral wing portions providing downwardly facing dual axially oriented surfaces, and axially inwardly directed member and a radially outer portion with a radially inclined surface, whereby, said inner rim is seated on, and thereafter locked on, said wheel by initial and final tightening of said inner rim fastening assemblies against each said clamp lug leg portion, said initial tightening of said inner rim fastening assemblies seating said radially inclined clamp lug body portions in concentric registry with said radially inclined wheel felloe surfaces; said final tightening of said inner rim fastening assemblies to apply a load for axial movement of said clamp lug leg portions locking said rim on said wheel by the full surface engagement of said substantially continuous axially facing surfaces on said clamp lug leg portions with said radially directed wheel felloe surfaces and the elastic deformation of said clamp lugs and said rim base edge portion relative to said substantially perpendicular plane of said radially directed wheel felloe surfaces, and, whereby, said outer rim is seated on, and thereafter locked on, said wheel by initial and final tightening of said outer irm fastening assemblies, said initial tightening of said outer rim fastening assemblies with said axially inwardly directed clamp element members in mating engagement with said clamp lug leg portions and said dual axially oriented surfaces on said lateral wing clamp element portions in mating engagement with said axially outer pair of dual wheel felloe surfaces and said dual axially oriented surfaces on said lateral wing clamp lug portions in radially registered engagement with said axially inner pair of dual wheel felloe surfaces, seating said radially inclined clamp lug body portions in concentric registry with said radially inclined clamp element surfaces; said final tightening of said outer rim fastening assemblies to apply a load for axial movement of said clamp lug leg portions locking said outer rim on said wheel by the full surface engagement of said substantially continuous axially facing surfaces on said clamp lug leg portions with said radially directed wheel felloe surfaces and the elastic deformation of said clamp lugs and said rim base edge portion relative to said substantially perpendicular plane of said radially directed wheel felloe surfaces.

* * * * *

UNITED STATES PATENT AND TRADEMARK OFFICE
CERTIFICATE OF CORRECTION

PATENT NO. : 4,371,213
DATED : Feb. 1, 1983
INVENTOR(S) : William D. Walther

It is certified that error appears in the above-identified patent and that said Letters Patent are hereby corrected as shown below:

In the Abstract, line 3, "fellow surfaces" should read
--felloe surfaces--;

Col. 4, line 25, "fello surfaces" should read
--felloe surfaces--;

Col. 6, line 30, "intersection" should read --intersecting--;

Col. 7, line 31, "stud 7" should read --stud 27--;

Col. 7, line 41, "clamp lugs 54" should read --clamp lugs 45--;

Col. 7, line 55, after "wheel 120 and" delete --and--;

Col. 10, line 33, "outer irm" should read --outer rim--.

Signed and Sealed this

Tenth Day of May 1983

[SEAL]

Attest:

GERALD J. MOSSINGHOFF

Attesting Officer

Commissioner of Patents and Trademarks